US012663331B2

(12) United States Patent
Gomes et al.

(10) Patent No.: US 12,663,331 B2
(45) Date of Patent: Jun. 23, 2026

(54) ACOUSTO-OPTICAL TRANSDUCER AND METHOD FOR PIPELINE LEAK DETECTION, LOCALIZATION AND QUANTIFICATION

(71) Applicants:PETRÓLEO BRASILEIRO S.A.—PETROBRAS, Rio de Janeiro (BR); IMMER MESSEN SOLUÇÕES DE TECNOLOGIA LTDA, Curitiba (BR); FUNDAÇÃO DE APOIO A EDUCAÇÃO, PESQUISA E DESENVOLVIMENTO CIENTÍFICO E TECNOLÓGICO DA UNIVERSIDADE TECNOLÓGICA FEDERAL DO PARANÁ, Curitiba (BR); UNIVERSIDADE TECNOLÓGICA FEDERAL DO PARANÁ, Curitiba (BR)

(72) Inventors: Danilo Fernandes Gomes, Curitiba (BR); Jean Carlos Cardozo Da Silva, Curitiba (BR); Carla De Araujo Ferreira Melo, Rio de Janeiro (BR); Guilherme Heim Weber, Curitiba (BR); Eduardo Luis Gerla Rodino, Rio de Janeiro (BR); Cicero Martelli, Curitiba (BR)

( * ) Notice: Subject to any disclaimer, the term of this patent is extended or adjusted under 35 U.S.C. 154(b) by 320 days.

(21) Appl. No.: 18/537,400

(22) Filed: Dec. 12, 2023

(65) Prior Publication Data

US 2024/0192080 A1 Jun. 13, 2024

(30) Foreign Application Priority Data

Dec. 13, 2022 (BR) .......................... 1020220254338

(51) Int. Cl.
*F17D 5/06* (2006.01)
*G01M 3/24* (2006.01)
*G01M 3/38* (2006.01)

(52) U.S. Cl.
CPC .............. *G01M 3/243* (2013.01); *F17D 5/06* (2013.01); *G01M 3/38* (2013.01)

(58) Field of Classification Search
CPC ........... F17D 5/06; G01M 3/38; G01M 3/243
See application file for complete search history.

(56) References Cited

U.S. PATENT DOCUMENTS

2006/0225507 A1* 10/2006 Paulson .................... F17D 5/06
                                                        374/4
2022/0196461 A1*  6/2022 Hu .......................... G01H 9/004
2022/0279287 A1*  9/2022 Hu ......................... H04R 23/008

FOREIGN PATENT DOCUMENTS

CN            217899002 U   * 11/2022

* cited by examiner

*Primary Examiner* — Jamel E Williams
(74) *Attorney, Agent, or Firm* — Sterne, Kessler, Goldstein & Fox P.L.L.C.

(57) ABSTRACT

The present invention is in the field of technologies applied to fluid transporting pipelines and, more specifically, it refers to an acousto-optical transducer and a method capable of sensing, monitoring and quantifying losses and leaks in steam plants in oil and gas, food, energy generation industries, among others. Particularly, the present invention describes an acousto-optical transducer for sensing, locating and quantifying leaks in pipelines and equipment for use in distributed optical sensing systems. The apparatus comprises a structure that maximizes the acoustic sensitivity of the fiber, consisting of a housing; a waveguide; a membrane; and a membrane attachment bracket for supporting the membrane; wherein the waveguide is helically arranged and rigidly fixed under the membrane. The method describes the use of the device in optical sensing systems for monitoring steam losses.

11 Claims, 3 Drawing Sheets
(3 of 3 Drawing Sheet(s) Filed in Color)

Leakage in A ½"

ACOUSTO-OPTICAL TRANSDUCER AND METHOD FOR PIPELINE LEAK DETECTION, LOCALIZATION AND QUANTIFICATION

FIELD OF THE INVENTION

The present invention is in the field of fluid transporting pipelines and, more specifically, it refers to an acousto-optical transducer and a method capable of sensing, monitoring and quantifying losses and leaks in pipelines in steam plants in oil and gas, food, energy generation industries, among others.

BACKGROUND OF THE INVENTION

In oil refining industries, steam plants operate the generation and distribution of steam to the most distinct areas of a refinery. These plants are made up of several pipes arranged in ordered arrangements that make up the so-called "pipelines" or "piperacks", and/or are distributed across processing units. The fluid transported along these pipelines consists of water in vapor state, under pressure, temperature and flow levels that vary depending on its application.

In this type of industry, as well as in food, pharmaceuticals industries, among others, leaks in pipelines and their accessories are frequent and highly relevant issues, as they lead to losses in energy performance, increase greenhouse gas emissions and increase operational costs.

In pipelines, such leaks happen for different reasons, the main ones being those related to wall corrosion and collapsed connections and junctions. Furthermore, losses not directly related to leakage points may occur in degraded, faulty components, such as valves and traps.

To detect failures in valves and traps, inspections are commonly carried out on site using portable measuring instruments such as, for example, ultrasound measuring systems. In turn, leaks that occur in pipelines are usually identified by visual inspection.

Due to the long lengths of piping involved, as well as the large number of traps and valves present in some industrial plants, the time taken for a complete inspection of these systems be carried out is too long to allow for an effective maintenance routine once it is carried out by a small team and involves difficult-to-access locations.

Nowadays, one of the techniques used to detect leaks in steam plants is based on infrared thermography, which monitors steam transporting systems by measuring the temperature of components or parts of the system, without the need for directly contacting the elements under analysis. Using this technique makes it possible to identify and locate defects in heat distribution profiles. Furthermore, from a density estimate (concentration of molecules) given the absorbance detected in each pixel in the image in the infrared spectrum together with the volume occupied by the cloud detected in the image, the leaked mass can be estimated.

Furthermore, there are techniques based on acoustic sensing using discrete sensors, which detect steam leak sound waves to identify holes in pipelines by spectral analysis of the sound of the leak, steam or water, at high pressure. The frequency response of a system in a normal operating state, composed of the sounds of combustion in the furnace or the spraying of fuel on the burner in a boiler is composed of low frequencies. However, the frequency response of sounds generated by pipe leaks is mainly made of components scattered at high frequencies. Therefore, evaluation of spectral content over time allows the recognition of specific patterns and consequently the classification of events in order to support a steam loss diagnostic tool.

Application environments generally involve classified areas that are under severe restrictions for the implementation of sensors, mainly regarding the performance of measurements susceptible to the generation of ignition sources, as well as the implementation of their respective power supply and communication circuits. Furthermore, the use of discrete sensors becomes unfeasible given the high number of them that are required for a dense and large coverage. In this scenario, the use of distributed sensing technology using optical fiber is shown to be promising for this application as it allows the remote monitoring through a fiber optic cable acting as a sensing element along its entire length passively, without the need for power and communication structures. Among fiber optic sensing technologies, the technology of Distributed Acoustic and Temperature Sensing, DATS, offers the possibility of remotely sensing, locating and characterizing leaks and failing components in steam transport plants through the continuous and simultaneous acoustic and temperature monitoring across tens to thousands of sensor points, with high sensitivity measurements and spatial resolution on the order of one meter.

However, there are difficulties in implementing fiber optic sensing systems in these environments. Installation of an optical cable directly coupled to each of the ducts becomes complex due to the large number and lengths involved, which are distributed across different geometries that make installation, possible future maintenance operations and on-site processes difficult. Moreover, sounds caused by leak phenomena loaded with spectral content at high frequencies may be significantly attenuated when passing through the air propagation path. Detection through the use of optical cables without being in mechanical contact with the leak source structures, that is, far from the ducts, can be compromised by the weak acoustic signal.

Therefore, there is a need to develop a solution based on optical fiber distributed sensing systems, using transducer devices that maximize the acoustic sensitivity of the optical cable in order to allow remote monitoring of steam losses complementarily to sensors present in cable sections directly coupled to ducts and equipment. The solution must be optimal to be applied in industrial environments that require steam in their process and that involve a large amount of piping and equipment, such as valves and steam traps, and must allow monitoring of the entire industrial plant in real time and at low cost, for using optical fiber as a sensing element throughout its entire length, thus enabling great coverage of the plant.

Furthermore, there is also a need to develop solutions that can be applied to any steam plant, whether in the oil and gas, food, power generation industries, among others, including in existing installations, without the need for significant adaptations or changes in the plant.

STATE OF THE ART

Search for the history of the invention in question has led to some documents that disclose matters that are within the technological field of the present invention.

Document US 2022/0196461 describes distributed acoustic sensing (DAS), that utilizes a differential phase to detect phase changes between two locations of a DAS sensing fiber to ascertain vibrational/acoustic activities/environment at intermediary fiber locations between the two locations. Additionally, systems, methods, and structures according to aspects of said document may employ a fiber coil comprising a segment of fiber wrapped in acoustic sensitive material ("acoustic signal collector"). The material responds to an environmental acoustic signal, which results in strain applied to the fiber. Furthermore, rather than using a measured phase difference between the two ends of the fiber coil, systems, methods, and structures according to aspects of the present disclosure utilize all samples collected from one end of the fiber coil to the other end of the fiber coil (the left side of the coil to the right side of the coil)—which may be extended further. Every two samples covering a partial or an entire section of the fiber coil are used as a pair (a "differential pair") to determine a phase difference and the results from all the pairs are averaged to form one output exhibiting a reduced noise level and signal.

However, the document is not able to disclose or suggest an acousto-optical transducer that uses an optical waveguide arranged helicoidally in a material membrane having mechanical properties that enhance the conversion of acoustic waves into mechanical waves in the membrane structure itself. Furthermore, there is no suggestion in the aforementioned document of a waveguide length mechanically coupled to the membrane perimeter in a rigid manner to enable the entire length of fiber coupled to the structure to be sensitized by mechanical vibrations originating from the conversion of acoustic waves.

Concerning document US 2022/0279287 there are disclosed distributed fiber optic sensing (DFOS) as well as distributed acoustic sensing (DAS) systems, methods and structures, which employ active microphones to enhance DAS operational capabilities by using an active circuit to amplify acoustic signals including voice(s). The circuit includes a microphone to collect acoustic signal(s) resulting from voice signals in the environment, and a speaker or a vibration device driven by an amplifier. The circuit can be clipped onto the fiber, with direct contact through the speaker or vibration device. A microcontroller may advantageously be employed to control the circuit for reduced power consumption, by sensing activities locally and only enabling the speaker when needed. The microcontroller may also send other information such as battery status to the DFOS interrogator through vibration codes. However, the document does not disclose or suggest an acousto-optical transducer device to detect, locate and quantify leaks in steam plants in real time, which is capable of using optical waveguides that measure acoustic signals due to its geometry that increases sensitivity and/or thermal signals.

Finally, the prior-art document US 2006/0225507 describes a process and apparatus for sensing possible leaks in a pipeline. The pipeline is monitored continuously by acoustic monitoring means, and acoustic events indicating a possible leak are noted. The pipeline is also equipped with temperature monitoring means, and is monitored for temperature either continuously, periodically or on demand. A leak is deemed probable at any location where there is an acoustic event indicating a possible leak, and at approximately the same time, a temperature difference greater than a pre-chosen amount between that location and adjacent locations. However, the aforementioned document makes no mention or suggestion of an acousto-optical apparatus for monitoring leaks in steam plants in real time, which uses optical (planar or cylindrical, or a combination of both) waveguides arranged in a geometry that allows for increased sensitivity to measure acoustic and/or thermal signals, the waveguide being arranged in a helical manner on a material membrane having mechanical properties that enhance the conversion of acoustic waves into mechanical waves.

BRIEF DESCRIPTION OF THE INVENTION

The present invention is in the field of technologies aimed at sensing, locating and quantifying leaks in steam plants and, more specifically, it refers to an acousto-optical transducer and method capable of detecting, monitoring and quantifying losses and leaks in steam plants in the oil and gas, food, power generation industries, among others.

Therefore, the present invention seeks to solve the problems encountered in the prior art by providing an acousto-optical transducer device and a method for sensing, locating and quantifying leaks in pipelines in real time using optical waveguides (planar or cylindrical, or a combination of both) arranged in a geometry that allows increased sensitivity to measure acoustic and/or thermal signals (thermal gradient).

The waveguide used by the transducer of the present invention is helically arranged on a material membrane having mechanical properties that enhance the conversion of acoustic waves into mechanical waves. The helical arrangement is responsible for increasing the waveguide length, which accordingly increases the transducer sensitivity.

It is also noteworthy that the membrane where the waveguide is attached has a dual function, one relating to protecting the waveguide, and the other relating to transferring energy more efficiently to the guide.

Furthermore, the acousto-optical transducer of the present invention can be replicated and multiplexed on the same optical link, enabling operation over a large coverage area throughout the industrial plant.

As it is built using dielectric materials, the transducer has o installation restrictions in plants susceptible to electromagnetic noise.

The transducer of the present invention can, therefore, be applied to monitor a large coverage area, allowing the identification and quantification of steam losses in real time, helping to prioritize maintenance resources to repair leaks, with a consequent reduction in the operating costs involved in the production of steam (consumption of natural gas and treated water) and optimization of costs involved in diagnostic and repair services. Furthermore, use of the transducer of the present invention would allow a reduction in the presence of staff in the operational area to diagnose steam plant equipment failures, resulting in gains in operational safety.

It is also important to emphasize that the present invention can be applied to existing installations, without the need for adaptations or significant changes to the plant. This is due to the principle of measuring acoustic waves that propagate through the air (irradiated) and/or through the structure itself (conducted).

Therefore, the aforementioned advantages and objects of the present invention are achieved by providing an acousto-optical transducer for sensing, locating and quantifying leaks in pipelines comprising: a housing; a waveguide; a membrane; and a membrane attaching bracket for supporting the membrane; wherein the waveguide is helically arranged and rigidly fixed under the membrane.

Furthermore, in one embodiment of the present invention a system for sensing, locating and quantifying leaks in pipelines is provided, which comprises: one or more acousto-optical transducers; and a distributed optical sensing system comprising one or more query devices and one or more fiber optic cables; wherein one or more acousto-optical transducers are installed in series in the vicinity of or in the sensing system.

Moreover, in one embodiment of the present invention, a method for sensing, locating and quantifying leaks in pipelines is provided, which comprises: installing one or more acousto-optical transducers in the vicinity of or in a distributed optical sensing system arranged throughout a region to be monitored in a pipeline; sensing through one or more acousto-optical transducers an acoustic event caused by a fault or leak along the monitored pipeline; acquiring signals related to the acoustic event from the acousto-optical transducer over time; determining the location of the failure or leak in the pipeline depending on the position of one or more transducers and the intensity of acquired signals; and quantifying steam losses caused by leaks and failures in components through the recognition of signal patterns acquired in the time and frequency domains, with subsequent classification of the event.

BRIEF DESCRIPTION OF THE FIGURES

The previous brief description, as well as the detailed description below, of the preferred embodiments of the present invention, will be better understood when read together with the accompanying drawings. For the purpose of illustrating the present invention, embodiments thereof are shown in the drawings. It must be understood, however, that the present invention is not only limited to the precise arrangements and instruments shown.

The patent or application file contains at least one drawing executed in color. Copies of this patent or patent application publication with color drawings will be provided by the Office upon request and payment of the necessary fee.

Figure 1:
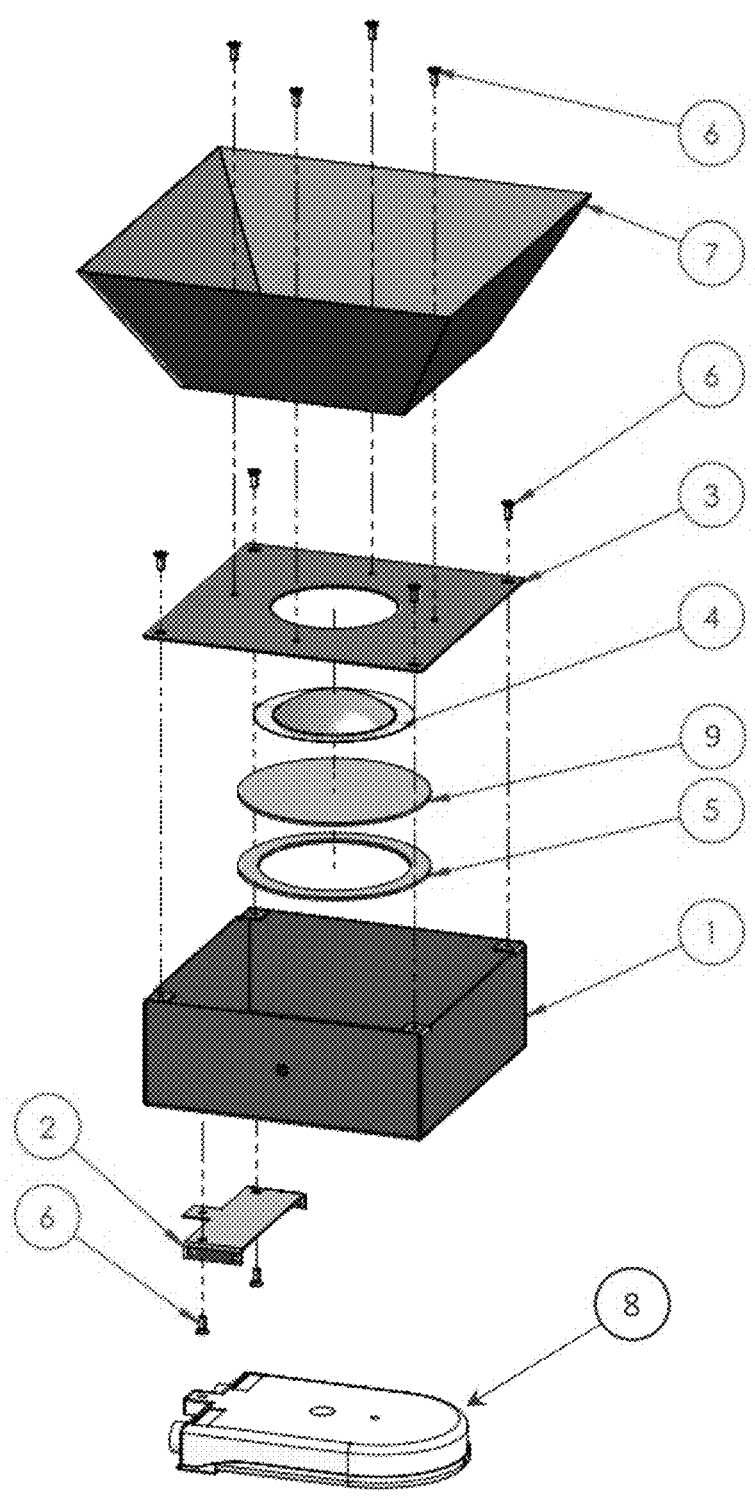

Therefore, the present invention will be described below with reference to typical embodiments thereof and also with reference to the attached drawings, in which:

FIG. 1 shows an exploded view of an acousto-optical transducer, according to an exemplary configuration of the present invention.

Figure 2:
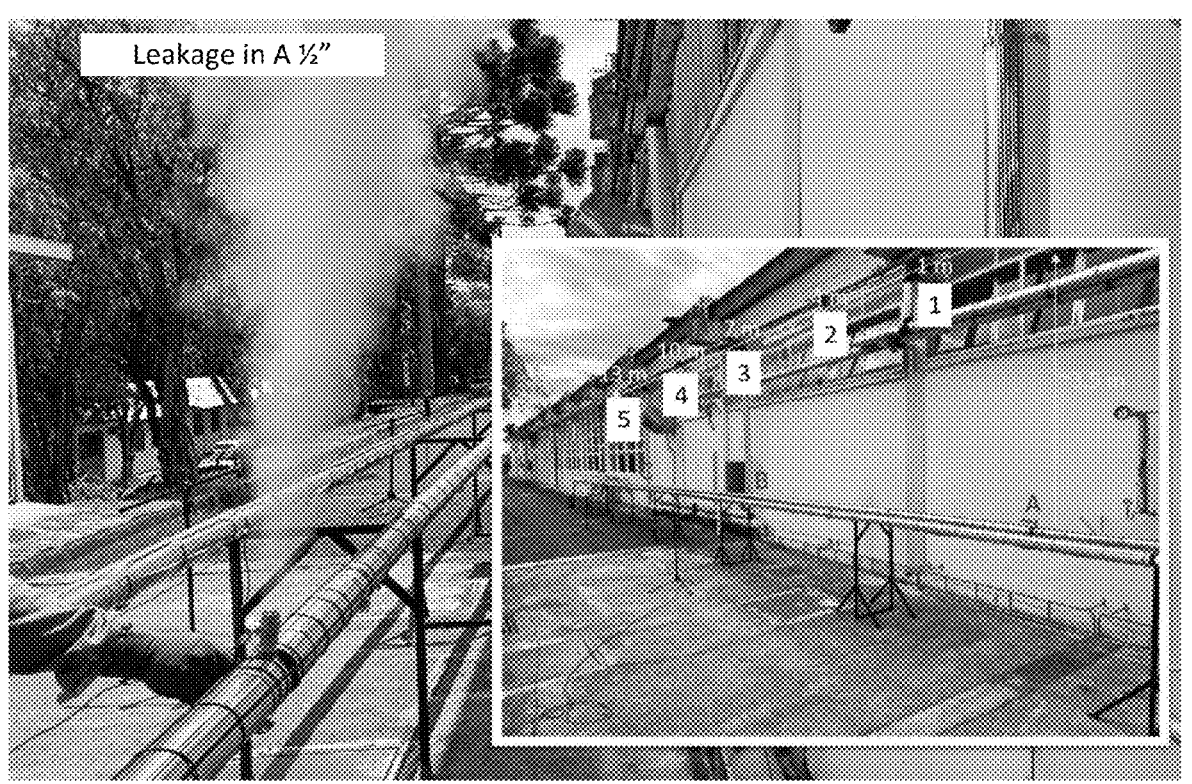

FIG. 2 shows a photograph of a reduced-scale steam plant for emulating steam leaks, in accordance with an exemplary configuration of the present invention.

Figure 3:
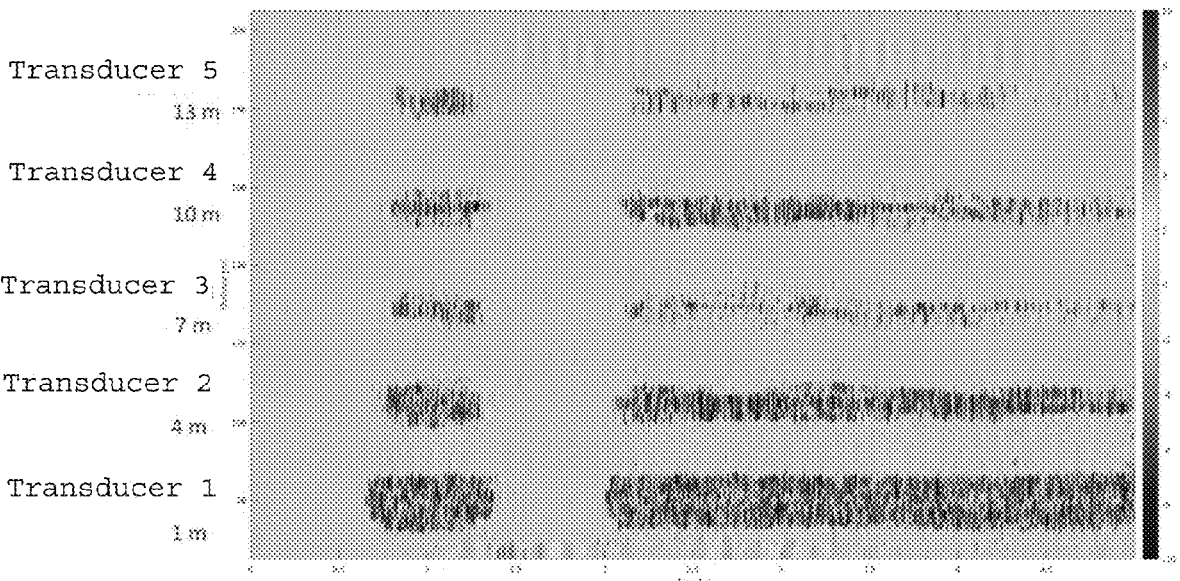

FIG. 3 depicts a graph of test results showing the signals acquired from five acousto-optical transducers placed in the vicinity of the steam plant of FIG. 2, according to an exemplary configuration of the present invention.

DETAILED DESCRIPTION OF THE INVENTION

In the following, reference is made in detail to the preferred embodiments of the present invention as illustrated in the accompanying drawings. Whenever possible, the same or similar reference numbers will be used throughout the drawings to refer to the same or similar features. It should be noted that the drawings are simplified and are not drawn to precise scale, so slight variations are anticipated.

The present invention is aimed at applications in industrial environments that require steam in their process and that have a large number of pipelines (arrangements of "pipelines" or "pipeways") and equipment, such as valves and steam traps. Particularly, the present invention relates to an acousto-optical transducer, also designated as an acousto-optical amplifier, which is intended for use in distributed optical sensing system installations, i.e., sensing systems that use fiber optic cables to transmit signals (optical link) and thus monitor certain conditions in pipelines.

In general, the operating principle of the technology related to a distributed optical sensing system to sense steam losses (leaks, component failures, and so on) in industrial plant pipelines in the oil and gas, food, power generation fields, and so on, consists of a query device that sends, or emits, a pulse of light of a known pulse width, the light source being of high coherence. The emitted light pulse propagates through the optical fiber connected to the query device along the entire length of the fiber, interacting with the local molecules that comprise the core of the optical fiber.

As a result of the interaction between the emitted light pulse and the core of the optical fiber, there will be a reflected beam of light due to the elastic phenomenon of Rayleigh scattering of light, for each region excited by the light pulse continuously along the fiber length. Part of such reflected light beam is confined within the core of the optical fiber and returns to the end from which the pulse was emitted, that is, the end connected to the query device. This phenomenon is known as backscattering.

Furthermore, the backscattered light beam carries information about the degree of agitation of the molecules along the entire length of the optical fiber, which is possible by using a high coherence light source in the query device that generates reflection patterns with a phase of the electromagnetic light wave well defined according to phenomena that alter the state of agitation of local molecules in the fiber core.

Distributed optical sensing, therefore, is carried out by reading these phase variations of the backscattered signal. More specifically, mechanical deformation events cause stretching, or stretch, of the location of the fiber and modify the spatial distribution of molecules, altering the optical path through the fiber core due to the Poisson effect and also altering the refractive index due to the photoelastic effect. It is noteworthy that temperature changes also affect the phase of the backscattered beam, but in ranges that go up to millihertz (mHz), while phase changes in ranges that go from mHz to tens of kilohertz (kHz) are predominantly governed by acoustic and mechanical deformation disturbances.

Thus, data resulting from measurements by distributed acoustic sensing, DAS, systems offer means to extract characteristics from these phenomena in a distributed and continuous manner along the entire length of the monitored optical fiber.

Spatial dimension of the sensor channels in the fiber is composed of the backscattered signal acquired as a function of time, and which is associated with each position in the optical fiber through the relationship between the propagation speed of light in the fiber and the round-trip travel time through the pulse and the reflected signal. Therefore, each frame of backscattered signal is acquired in an instant of time, generating patterns of reflected signals for each acquisition, and composing the dimension of time evolution of the channels. The result is continuous acoustic and temperature sampling of the entire structure to which the optical cable is attached, for example, in the pipeline, valves or traps, promoting continuous and simultaneous monitoring of tens of thousands of points through real time, high sensitivity measurements.

Within the context set out above, in one of its embodiments, the present invention provides an acousto-optical transducer, or an acousto-optical amplifier, to magnify or improve the sensitivity of a distributed sensing system in capturing phase variations due to acoustic phenomena.

Thus, FIG. 1 shows in an exploded view, for better visualization, an acousto-optical transducer for sensing, locating and quantifying leaks in pipelines, with its main components being in accordance with a preferred embodiment of the present invention. In this configuration, the transducer comprises a housing 1, a waveguide 9, a membrane 4 and a membrane attachment bracket 5 for supporting the membrane 4, wherein the waveguide is arranged helically, i.e., with a plurality of portions of the waveguide arranged circularly one above the other, and rigidly attached to under the membrane 4.

According to one embodiment of the present invention, the membrane 4 has a convex shape that extends outside the housing 1 and is composed of a material having properties that enhance the reception of acoustic waves, capturing the characteristics of these waves such as amplitude and frequency response, and converting them into mechanical waves in the membrane structure 4 itself. Accordingly, the membrane 4 is configured to protect the waveguide attached thereto and transfer the energy generated by the acoustic wave to the guide. Materials used to manufacture the membrane 4 include at least one of: titanium, selenium, polyester, polycarbonate, polymer blends obtained from the physical mixing of two or more polymers, and "composite materials" where the fiber or photorefractive elements can be embedded.

Furthermore, in one embodiment of the present invention, the waveguide is planar, or cylindrical, or a combination of both. It should be noted that the arrangement of the waveguide in a helical shape under the membrane 4 makes it possible to increase the length of the waveguide and, consequently, its area for capturing the acoustic signal from the membrane 4.

Furthermore, according to one embodiment of the present invention, the length of bare optical fiber acting as a waveguide attached under the membrane 4 is at least equal to the spatial resolution of the sensor system composed of the optical fiber disposed along the monitoring region in the pipeline. That is, the waveguide length attached under the membrane 4 is at least equal to a linear distance along the length of the fiber optic cable of a sensor system arranged in a region of interest to be monitored in the pipeline. Thus, the length of the waveguide confined in a small area, as determined by the membrane 4 area, is at least equivalent to a linear distance in the pipeline traveled by the optical fiber of the sensor system.

Accordingly, the ability to detect and locate faults or leaks along the pipeline becomes more punctual and maximizes the response to acoustic waves, since more of the optical path is exposed to the same stimuli, which in turn generate patterns of phase variations accumulated over the exposed length, therefore maximizing amplitude of the final response.

In one embodiment of the present invention, the housing 1 acts to accommodate the optical fiber section of the sensor system that will be connected to the waveguide attached to the membrane 4.

Also, according to one embodiment of the present invention, the acousto-optical transducer further comprises an attachment bracket 2 for attaching an optical splice protective box 8. Basically, this latter structure has the function of accommodating and protecting the optical splices that connect the optical fiber used within the transducer in series to the optical fiber of the optical cable itself used as a sensing element in the DATS system. As shown exemplarily in FIG. 1, the attachment bracket 2 is attached to a lower region of the housing 1 by means of attachment screws 6. According to one embodiment of the present invention, the optical splice protective box 8 attached to the attachment bracket 2 acts by flexibilizing and organizing the connections between the optical fiber section of the sensor system and the waveguide.

Furthermore, according to one embodiment of the present invention, the acousto-optical transducer can be configured for direct coupling to the piping that transports liquids or gases, to command and control devices in the pipeline, or even equipment. Coupling can be implemented by using clamps or coupling structures that guarantee rigid attachment of the transducer to the surface of pipes and equipment. This embodiment enables a completely configurable and adaptable customization for the most different scenarios of application, as it allows a combination of the use of the optical cable as a sensing element along its length with numerous acousto-optical transducers connected in series, whether coupled directly to pipes and equipment or installed at a distance from the monitored scenes.

As shown in FIG. 1, the acousto-optical transducer, in one embodiment of the present invention, further comprises an attachment cover 3 having a substantially centralized opening through which the membrane 4 extends outwardly. Note that the cover 3 is attached to the housing 1 by means of attachment screws 6 arranged at its ends. Furthermore, according to one embodiment of the present invention, the acousto-optical transducer further comprises a targeting element 7 for targeting acousto-optical signals to the membrane 4. In one embodiment of the present invention, the targeting element 7 has a shape that converges towards the membrane 4, and may have the shape of a frustum of a pyramid, a frustum of a cone, or any other shape suitable for targeting signals towards the membrane 4. The targeting element 7 is attached to the cover 3 using attachment screws 6.

Furthermore, in accordance with one embodiment of the present invention, one or more acousto-optical transducers are configured to be installed in the vicinity of or in a distributed optical sensing system, which comprises one or more query devices and one or more fiber optic cables, to enhance the monitoring capabilities of an industrial steam transport plant. Thus, one or more acousto-optical transducers are configured to be installed in series along the optical fiber of the sensing system, also designated as sensor system, at specific sites along the pipeline path where there is an interest in sensing sounds, hence composing a network of "microphones".

It should be noted that the application of one or more transducers in a distributed optical sensing system presents advantages associated with fiber optic sensing such as mechanical and thermal robustness, electromagnetic immunity, reduced size, and easy installation. Additionally, there is the fact that the system promotes remote monitoring, without the need for human intervention, with coverage of long areas (kilometers of optical cable coverage), with a dense network of sensors without the need for power supply structures and communication. This makes the system ideal for application in hazardous areas. Furthermore, the use of acousto-optical transducers does not inhibit the continuous monitoring of vibration and temperature parameters along the entire optical cable belonging to the installation.

The present invention further provides a method for sensing, locating and quantifying leaks in steam plant pipelines. The method of the present invention enables the complete monitoring of a pipeline to identify and quantify steam losses caused by failures or leaks, prioritizing maintenance resources to repair such leaks, with a consequent reduction in operational costs for steam production (consumption of natural gas and treated water) and optimization of the costs involved in diagnostic and repair services.

Additionally, there is less potential for damage to equipment from steam leaks, as leaks are quickly detected.

Thus, in one embodiment of the present invention, the method comprises: installing one or more acousto-optical transducers in the vicinity of or in a distributed optical sensing system arranged throughout a region to be monitored in a pipeline; sensing through one or more acousto-optical transducers an acoustic event caused by a fault or leak along the monitored pipeline; acquiring signals related to the acoustic event from the acousto-optical transducer over time; determining the location of the failure or leak in the pipeline depending on the position of one or more transducers and the intensity of acquired signals; and quantifying steam losses caused by leaks and failures in components through the recognition of signal patterns acquired in the time and frequency domains, with subsequent classification of the event.

It should be noted that, according to the present invention, the acquired signals have a temporal and frequency response that allows distinguishing characteristics of faults or leaks, which helps in determining the location of the fault or leak, as well as quantifying them (signal strength).

Additionally, the acquired signals from the transducer can be acoustic and/or thermal signals.

The one or more transducers of the present invention can also be configured to be replicated and multiplexed on the same optical link, enabling a large coverage area. Due to being designed with dielectric materials, the one or more transducers are not restricted from being installed in plants susceptible to electromagnetic noise and application in classified areas, as the device is fully passive.

Furthermore, coverage of installation of the transducer in the distributed optical sensing system is limited only to the attenuation implicit to the optical cable length, in the order of a few to tens of kilometers. Miniaturization of amplification elements and robustness of the optical cable make it possible to mimic the most complex geometries within the harsh environments of industrial plants. Creation of the microphone network makes it possible to apply a large number of processing techniques, extracting characteristics and classifying events, which justifies the applicability of the present invention to an apparatus, system and method.

Then, to demonstrate the efficiency and applicability of the present invention and its use, a test carried out with acousto-optical transducers in a distributed acoustic sensing system is described.

Examples and Results of the Present Invention

To validate the acousto-optical transducer, a small-scale steam plant was set up, as shown in FIG. 2. This plant emulates leaks at different flow rates which can be measured using conventional instruments.

To assess the transducer response in relation to the sensing, location and quantification of leaks, 5 transducers are arranged (associated with the numbers "1", "2", "3", "4" and "5" in FIG. 2) throughout the plant. The steam plant used to demonstrate the functionalities of the developed solution is a scale representation of the actual application environment. Two pipelines having a length of about 20 m are monitored by the distributed optical sensing system. In the optical cable, which acts as a sensing element along its entire length, the 5 transducers are connected by approximately 20 m of cable to each other, being spaced apart horizontally from each other by a linear distance of 3 m and installed at a vertical distance of 3.5 meters in relation to the monitored pipelines.

The results obtained, which are depicted in FIG. 3, show that the data acquired from the signals, such as time and frequency responses, make it possible to distinguish characteristics of the leaks that help in determining their location and quantification.

Thus, the signal presented in FIG. 3 exemplifies the measurement data generated by the distributed sensing system in the test scenario.

The test takes place by opening a 12.7 mm (0.5 inch) valve located at point A, as seen in the detail in FIG. 2, approximately 0.7 s from the beginning of the measurement, as seen in FIG. 3, in order to create a leak at this site. The valve was then closed and subsequently reopened after approximately 1 s, remaining open until the end of the acquired time.

The graph shown in FIG. 3 shows the signals acquired by the 5 transducers arranged on the plant (region to be monitored). In FIG. 3, the y-axis represents the length of the fiber optic cable in its entirety along the test circuit (steam plant), having a little more than 200 m in length. It is important to highlight that this length refers to the optical circuit that acts as a sensing element throughout its entire length, but that only a section of this length is installed in the area of interest for monitoring. In turn, the x-axis represents the temporal dimension, that is, the evolution of signals acquired at each position of the sensor system fiber optic cable over the acquired time. In this instance, FIG. 3 demonstrates a 5 s time window. Furthermore, the z-axis, represented by a color scale to the right of the graph, corresponds to the signal strength detected at each position of the fiber optic cable for each instant of time, given in units of radians as they are phase variations of the backscattered signal.

It should be noted that since the fiber optic cable acts as a sensing element along its entire length throughout the plant, there is a signal for the entire length of the monitored fiber optic cable. However, it should be noted, as shown in FIG. 3, that the signal strength is greater in positions where the acousto-optical transducers are installed, with approximately 10 m of bare optical fiber acting as waveguides attached to their respective membranes, being sensitized by acoustic waves caused by sounds from the steam leaks in each transducer.

Furthermore, the first transducer to detect the acoustic wavefront caused by the leak in A is the first in the direction of installation of the sensor system, close to 75 m. The same patterns are felt at later times in the following transducers, demonstrating that the sound is captured at different moments of time given the positioning of the transducers in the installation in view of the source that produced the acoustic event (the leak).

It is also important to highlight that in addition to the different detection times, a reduction in the amplitude detected in each transducer depending on the distance from the event location, given by the attenuation of the sound in the environment is also observed.

Those skilled in the art will value the knowledge presented herein and may reproduce the invention in the disclosed embodiments and other variants, as covered by the scope of the appended claims.

The invention claimed is:

1. An acousto-optical transducer for sensing, locating, and quantifying leaks in pipelines, the transducer comprising:
   a housing;
   a waveguide;
   a membrane; and
   a membrane attachment bracket for supporting the membrane;
   wherein the waveguide is helically arranged and rigidly attached under the membrane.

2. The transducer claim 1, wherein the membrane has a convex shape that extends outwardly from the housing;

wherein the membrane is configured to protect the waveguide attached thereto;

wherein the membrane is configured to transfer energy generated by the acoustic wave to the guide; and wherein the materials used to manufacture the membrane include at least one of: titanium, selenium, polyester, polycarbonate, polymer blends obtained from the physical mixing of two or more polymers, or composite materials where the fiber or photorefractive elements can be embedded.

3. The transducer of claim 1, wherein the waveguide is planar, cylindrical, or a combination of both.

4. The transducer of claim 1, wherein the length of the waveguide attached under the membrane is greater than or equal to a linear distance along the length of a fiber optic cable of a sensor system arranged in a region of interest to be monitored in a pipeline.

5. The transducer of claim 1, wherein the housing accommodates a section of optical fiber from a sensor system configured to be connected to the waveguide attached to the membrane.

6. The transducer of claim 1, further comprising an attachment bracket for attaching an optical splice protective box;

wherein the attachment bracket is attached to a lower region of the housing by attachment screws.

7. The transducer of claim 1, further comprising an attachment cover having a centralized opening through which the membrane extends outwardly.

8. The transducer of claim 1, further comprising a targeting element for targeting acousto-optical signals to the membrane;

wherein the targeting element has a shape of a pyramid frustum or cone frustum converging towards the membrane.

9. A system for sensing, locating, and quantifying leaks in pipelines, the system comprising:

one or more acousto-optical transducers as defined in claim 1; and a distributed optical sensing system, comprising:

one or more query devices; and one or more fiber optic cables;

wherein the one or more acousto-optical transducers are installed in series in the vicinity of or in the distributed optical sensing system.

10. A method for sensing, locating, and quantifying leaks in pipelines, the method comprising:

installing one or more acousto-optical transducers in the vicinity of or in a distributed optical sensing system arranged along a region to be monitored in a pipeline;

sensing, through the one or more acousto-optical transducers, an acoustic event caused by a fault or leak along the pipeline;

acquiring signals relative to the acoustic event from the acousto-optical transducer over time;

determining the location of the fault or leak in the pipeline depending on the position of one or more acousto-optical transducers and the intensity of the acquired signals; and quantifying steam losses caused by leaks and faults in components through the recognition of signal patterns acquired in the time and frequency domains, with subsequent classification of the acoustic event.

11. The method of claim 10, wherein the signals acquired from the acousto-optical transducer comprise acoustic signals, thermal signals, or a combination thereof.

* * * * *